United States Patent [19]

Iwasaki

[11] Patent Number: 4,599,662
[45] Date of Patent: Jul. 8, 1986

[54] MECHANISM FOR DRIVING A TAPE RECORDER

[75] Inventor: Tadahisa Iwasaki, Saitama, Japan

[73] Assignee: Pioneer Ansafone Manufacturing, Saitama, Japan

[21] Appl. No.: 438,233

[22] Filed: Nov. 1, 1982

[30] Foreign Application Priority Data

Nov. 2, 1981 [JP] Japan .................... 56-175899

[51] Int. Cl.4 .................... G11B 15/24; G11B 15/32
[52] U.S. Cl. .................... 360/96.4; 242/200; 360/90; 360/96.3; 360/105
[58] Field of Search .................... 242/199–201; 360/71, 72.1, 74.1, 90, 93, 84, 96.1, 96.2, 96.3, 96.4, 105, 137

[56] References Cited

U.S. PATENT DOCUMENTS

| 3,934,270 | 1/1976 | Iwata | 360/71 |
| 4,238,808 | 12/1980 | Tomita | 360/96.1 |
| 4,301,483 | 11/1981 | Santoro | 360/90 |
| 4,314,292 | 2/1982 | Umaba | 360/86 |
| 4,330,098 | 5/1982 | Santoro | 242/201 |
| 4,399,475 | 8/1983 | Shimomae | 360/96.3 |
| 4,404,606 | 9/1983 | Watanabe | 360/105 |
| 4,409,634 | 10/1983 | Sawaki et al. | 360/137 |
| 4,420,783 | 12/1983 | Suezawa et al. | 360/137 |
| 4,425,591 | 1/1984 | Ito et al. | 360/137 |

FOREIGN PATENT DOCUMENTS

| 0820698 | 3/1958 | United Kingdom | 242/201 |
| 2056743 | 3/1981 | United Kingdom | 360/96.4 |

Primary Examiner—A. J. Heinz
Assistant Examiner—David J. Severin
Attorney, Agent, or Firm—Sughrue, Mion, Zinn, Macpeak & Seas

[57] ABSTRACT

A mechanism for driving a tape recorder includes a selection lever supporting a pair of gears and selectively movable to bring the gears into mesh with gears on takeup and supply reels or out of mesh therewith under the control of a swing arm angularly movable in response to rotation of a cam plate having different cam faces for providing different modes of operation of the tape recorder. One of a pair of concentric integral gears is held at all times in mesh with one of the gears on the selection lever, and the other concentric gear is held in mesh with a gear on a joint arm, which can be brought into mesh with a motor gearing by a control arm only when the cam plate is held at rest.

3 Claims, 8 Drawing Figures

MECHANISM FOR DRIVING A TAPE RECORDER

BACKGROUND OF THE INVENTION

The present invention relates to a mechanism for driving a tape recorder, particularly of small size, with means for changing between different modes of operation of the tape recorder through utilization of rotative power from a motor.

SUMMARY OF THE INVENTION

It is an object of the present invention to provide a tape recorder driving mechanism having takeup and supply reels protected against accidentally driven rotation and hence against unwanted tape movement even when selection lever gears are in mesh with takeup and supply reel gears while different modes of operation of the tape recorder are being selected.

According to the present invention, a mechanism for driving a tape recorder comprises a pair of takeup and supply reels having takeup and suppy reel gears, respectively, a pair of first and second intermeshing gears rotatably disposed between and selectively engageable in mesh with the takeup and supply reel gears, respectively, a selection lever supporting the first and second gears and selectively movable between a first position in which the first gear is in mesh with the takeup reel gear, a second position in which the second gear is in mesh with the supply reel gear, and a third position in which the first and second gears are held out of mesh with the takeup and supply reel gears, a rotatable cam plate having cam faces for providing different modes of operation of the tape recorder, a swing arm angularly movable by the rotatable cam plate in response to rotation thereof, a drive source having a gearing, a pair of concentric third and fourth gears rotatable with each other, the third gear being held in mesh with one of the first and second gears, a joint arm having a fifth gear held in mesh with the fourth gear and movable to bring the fifth gear into and out of mesh with the gearing, and a control arm angularly movable in response to selection of one of the different modes of operation for actuating the joint arm to displace the fifth gear out of mesh with the gearing while the cam plate is rotating.

While any one of the different modes of operation is being selected during rotation of the cam plate, the joint arm is shifted by the control lever to move the gear thereon out of mesh with the gearing. Thus, a magnetic tape is prevented from accidentally travelling in the process of mode selection.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE INVENTION

Figure 1:
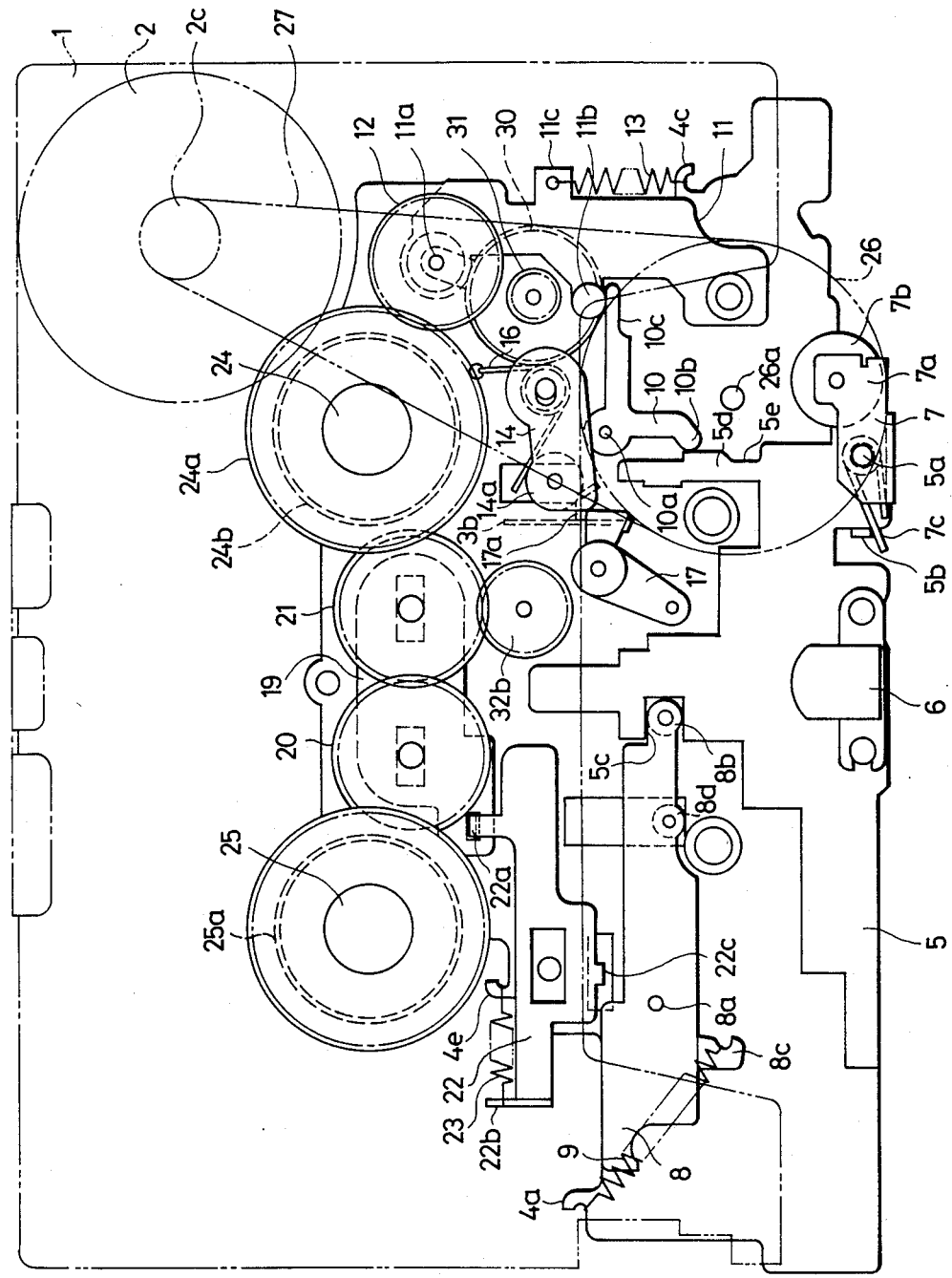
FIG. 1 is a plan view of parts of a drive mechanism of the invention which are located behind a first chassis.

As shown in FIGS. 1 through 4, a drive mechanism according to the present invention has a first chassis 1 and a motor 2 mounted by an attachment plate 2a on a back of the first chassis 1, the attachment plate 2a being attached to the back of the chassis 1 by sleeves 2b. A plunger 3 is also attached to the back of the chassis 1 and includes a retractable rod (no illustrated but enclosed in the plunger 3) coupled to a wire 3b. A second chassis 4 is located behind and attached to the first chassis 1 with a small clearance defined therebetween. There is a group of levers (later described) movably interposed between the first and second chassis 1, 4.

A head base 5 is slidably mounted on the second chassis 4 for vertical sliding movement, as shown in FIG. 1, and supports thereon a magnetic head 6 and a pinch roller unit 7. The pinch roller unit 7 is composed of a pinch holder 7a angularly movably mounted on a pin 5a secured to the head base 5, a pinch roller 7b rotatably attached to the pinch holder 7a, and a torsion spring 7c disposed around the pin 5a and having ends held in engagement respectively with an engagement member 5b on the head base 5 and the pinch holder 7a for urging the pinch roller 7b against a capstan 26a. The head base 5 can be controlled in its motion by a control lever 8 having a pin 8a pivotably supported on the second chassis 4. The control lever 8 also has an engaging end 8b fitted in a recess 5c in the head base 5 and a hook 8c remote from the engaging end 8b. A spring 9 acts between the hook 8c and a hook 4a on the second chassis 4 for normally biasing the control lever 8 to turn clockwise (FIG. 1) about the pin 8a. The control lever 8 also has a projection 8d disposed substantially centrally between the engaging end 8b and the pin 8a and held in engagement with a first cam 34a of a cam plate 34 (described later on).

A swing arm 10 is pivotably supported on the second chassis 4 by a pin 10a extending from the swing arm 10 at its bent corner. The swing arm 10 includes a slide member 10b held in sliding contact with a guide 5d on the head base 5 and an abutment end 10c remote from the slide member 10b held in abutment against a projection 11b on a slide lever 11. The slide lever 11 has a gear 12 mounted thereon by a pin 11a guided in a slant slot 4b defined in the second chassis 4. The projection 11b is held against the abutment end 10c of the swing arm 10. A spring 13 acts between a tab 11c of the slide lever 11 and a hook 4c of the second chassis 4 for normally urging the slide lever 11 downwardly. Therefore, the spring-loaded slide lever 11 urges the swing arm 10 to turn counterclockwise for enabling the slide member 10b to be pressed against the guide 5d on the slide base 5. When the slide base 5 moves upwardly to bring the slide 10b of the swing arm 10 into a recess 5e in the guide 5d, the swing arm 10 is angularly moved clockwise to allow the slide lever 11 to be lowered obliquely under the resiliency of the spring 13.

A joint arm 14 has a shaft 14a projecting through the second chassis 4 and supporting two gears 15a, 15b of larger and smaller diameters. The joint arm 14 is angularly movably attached by a screw to a face of the second chassis 4. The shaft 14a of the joint arm 14 has an end face guided in a guide aperture 1a in the first chassis 1 and normally urged to turn counterclockwise under the resiliency of a torsion spring 16. The guide 5d of the head base 5 has a distal end positioned in confronting relation to the shaft 14a. When the head base 5 is moved upwardly, the joint arm 14 is turned thereby clockwise against the force of the torsion spring 16. An L-shaped control arm 17 is centrally mounted for angular movement on the second chassis 4. Two gears 18a, 18b are attached to an end of the angular control arm 17 and positioned at the back of the second chassis 4. The other end of the control arm 17 has a projection 17a held in abutment against the angularly movable distal end of the joint arm 14. The wire 3b, which is connected at one end thereof to the retractable rod of the plunger 3, has the other end attached to a portion of the control arm 17 which is substantially midway between the projection 17a and the pivot about which the control arm 17 is angularly movable. When the plunger 3 is energized to retract the retractable rod for drawing the wire 3b, the control arm 17 is turned counterclockwise to displace the gears 18a, 18b, and at the same time the projection 17a causes the joint arm 14 to swing clockwise against the resiliency of the torsion spring 16. A selection lever 19 is slidably movable horizontally in the area between the first and second chassis 1, 4 and guided by guide slots 4d in the second chassis 4. A pair of intermeshing gears 20, 21 are mounted on a face of the selection lever 19. An actuator lever 22 has a protrusion 22a received in a hole 19a in the selection lever 19 and is horizontally slidably disposed in the area between the first and second chassis 1, 4. A spring 23 is connected between a spring retainer 22b of the actuator lever 22 and a hook 4e of the second chassis 4 for normally biasing the actuator lever 22 to move to the right. A pair of takeup and supply reels 24, 25 are rotatably mounted on a face of the second chassis 4 and projects forward through large-diameter holes 1b in the first chassis 1. The takeup reel 24 has two gears 24a, 24b, the gear 24a being larger in diameter and meshing with the gear 12 mounted on the slide lever 11 and projecting through a small-diameter hole 1c in the first chassis 1. The gears 24a, 12 are held in mesh with each other at all times regardless of the position which the slide lever 11 takes. The supply reel 25 also has a gear 25a. The gear 25a of the supply reel 25 and the gear 24b of the takeup reel 24 can alternately mesh selectively with the gears 20, 21, respectively.

The foregoing levers, arms and gears are all positioned in front of the second chassis 4.

The components such as a gear and gears behind the second chassis 4 will now be described.

A flywheel 26 with the capstan 26a journalled on the second chassis 4 is drivably coupled to a pulley 2c on a rotatable shaft of the motor 2 through an endless belt 27 laid around the flywheel 26 and the pulley 2c. The flywheel 26 has a small pulley 26b which is operatively coupled to a pulley 30 (later described) through an endless belt 28 extending around the pulleys 26b, 30. A gear 29 is attached to the flywheel 26 in a coaxial relation. The pulley 30 is rotatably mounted on a shaft 1d secured to the first chassis 1 and has a gear 31 integral therewith. When the slide lever 11 slides downwardly, in response to the advancing movement of the slide base 5, the gears 31, 12 are brought into mesh with each other for thereby transmitting rotative power from the belt 27 to the flywheel 26 to the belt 28 to the pulley 30 to the gear 31 to the gear 12 and to the takeup reel 24, which is then caused to rotate about its own axis. At this time, the flywheel 26 is rotated to feed a magnetic tape (not shown) at a constant speed as the tape is held against the pinch roller 7b and wound around the takeup reel 24. Two gears 32a, 32b of larger and smaller diameters are rotatably supported on a shaft 1e secured to the first chassis 1. The larger-diameter gear 32a is held in mesh at all times with the smaller-diameter gear 15b mounted on the joint arm 14, and the smaller-diameter gear 32b is held in mesh at all times with the gear 21 mounted on the selection lever 19. Two gears 33a, 33b of larger and smaller diameters are rotatably supported on a pin 4g fixed to the second chassis 4, the larger-diameter gear 33a meshing with the smaller-diameter gear 18b mounted on the control arm 17. A cam plate 34 is rotatably journalled on a pin 4f affixed to the second chassis 4 and is composed of a smaller-diameter first cam 34a, a larger-diameter second cam 34b, and a gear 34c. The projection 8d on the control lever 8 is pressed against the first cam 34a. Two gears 35a, 35b of larger and smaller diameters are rotatably mounted on an attachment plate 36 screwed to the pins 4f, 4g on the second chassis 4. The larger-diameter gear 35a is held in mesh with the smaller-diameter gear 33b, and the smaller-diameter gear 35b is held in mesh with the gear 34c of the cam plate 34. A rotatable brush 37 is fixed to a back of the gear 34c and has two contacts. A switch board 38 is fixedly mounted on the attachment plate 36 and has a plurality of contacts. When the brush 37 rotates in response to rotation of the cam plate 34, two selected contacts on the switch board 38 are brought into electrical contact with each other. The first and second cams 34a, 34b of the cam plate 34 are positioned in relation to the contacts on the switch board 38, as will be described later on.

A swing arm 39 has a proximal end journalled on a pin 4h affixed to the second chassis 4 and has on a distal end a projection 39a held in abutment against the second cam 34b. A wire 40 has one end secured to the swing arm 39 near the proximal end thereof and the other end engaging a bent tab 22c projecting from the actuator lever 22 through a slot 4i in the second chassis 4 beyond the back thereof. When the second cam 34b angularly moves with rotation of the cam plate 34, the swing arm 39 is turned to enable the wire 40 to slide the actuator lever 22 laterally, whereupon the selection lever 19 slides laterally to bring the gears 21, 20 selectively into mesh with the gear 24b of the takeup reel 24 and the gear 25a of the supply reel 25, respectively.

A tape cassette placed in the tape recorder is positioned at its back by a positioning plate 41.

The shapes of the first and second cams 34a, 34b of the cam plate 34 and the arrangement of the contacts on the switch board 38 will now be described.

Figure 2:
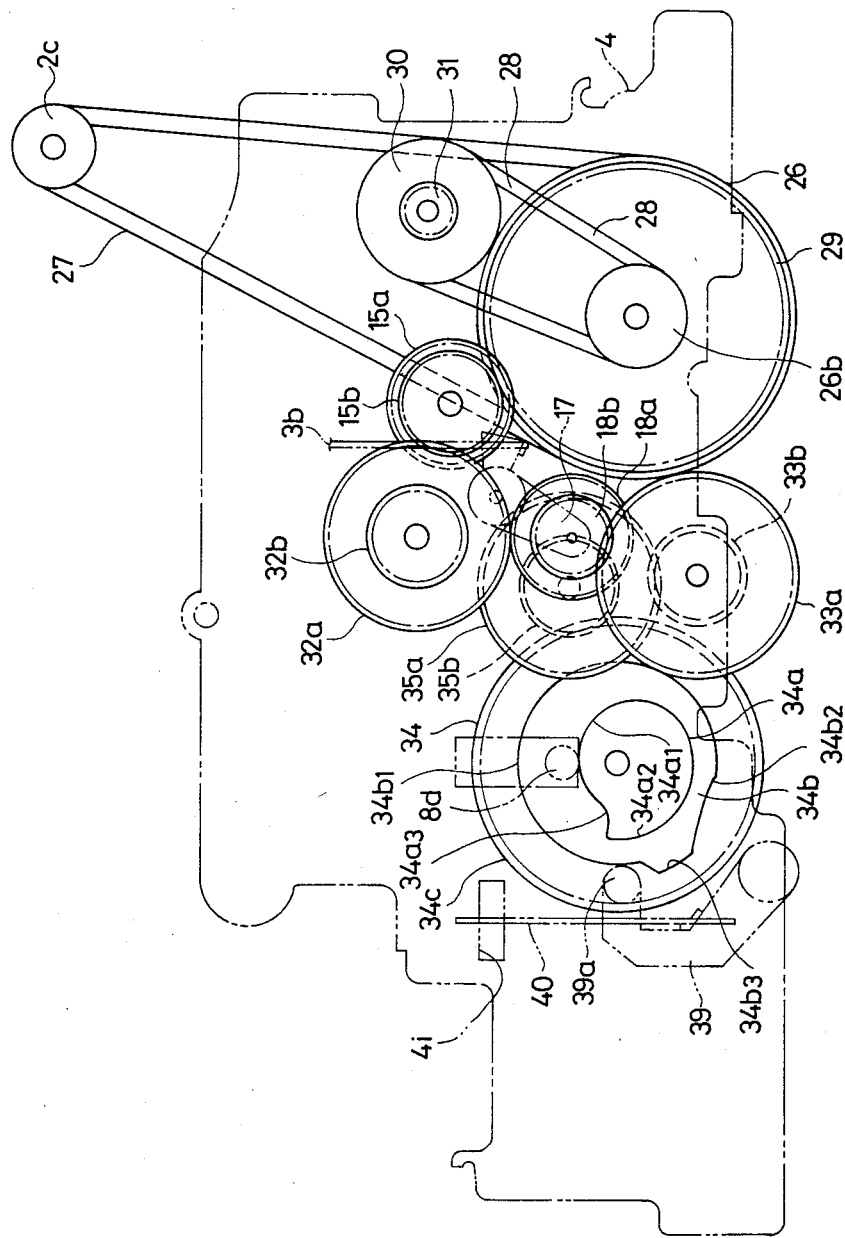
FIG. 2 is a plan view of parts of the drive mechanism which are disposed behind a second chassis.
Figure 3:
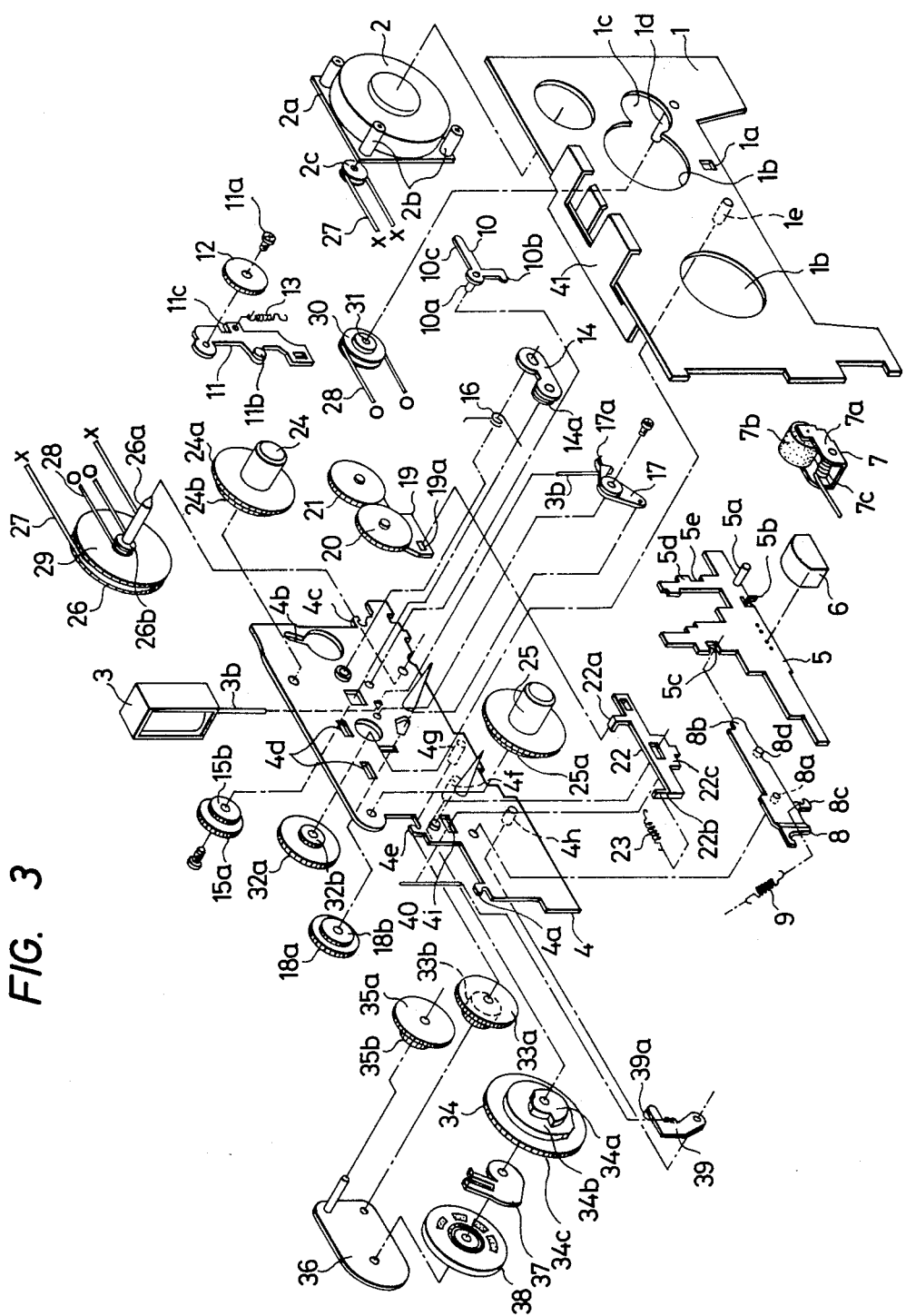
FIG. 3 is an exploded perspective view of the drive mechanism.

The cam 34a, as shown in FIG. 2, is composed of a substantially semicircumferential portion 34a1 having a progressively greater radius and a higher rate of surface inclination, a substantially semicircular portion 34a2 having a progressively greater radius and a reduced rate of surface inclination, and a minimum-radius portion 34a3. When the projection 8d of the control lever 8 engages the cam portion 34a1 during one revolution of the cam plate 34, the head base 5 moves upwardly just before the pinch roller 7b is brought into pressing engagement with the capstan 26a. When the projection 8d engages the cam portion 34a2, the head base 5 further moves upwardly to cause the pinch roller 7b to be pressed against the capstan 26a in a playback position. The cam 34b comprises a portion 34b1 having a concentric circular surface of a 270° arc, a portion 34b2 coextensive with substantially half of the remainder of the cam 34b and having a smaller radius than that of the portion 34b1, and a portion 34b3 coextensive substantially with the other half of the rest of the cam 34b and having a larger radius than that of the portion 34b1. When the projection 39a of the swing arm 39 engages the portion 34b1 while the cam plate 34b makes one revolution, the selection lever 19 is positioned centrally in its stroke to release the gears 20, 21 of meshing engagement with the gears 24b, 25a of the takeup and supply reels 24, 25, respectively. When the projection 39a engages the smaller-radius portion 34b2, the selection lever 19 moves to the right to cause the gear 21 to mesh with the gear 24b of the takeup reel 24. When the projection 39a engages the larger-radius portion 34b3, the selection lever 19 moves to the left to bring the gear 20 into mesh with the gear 25a of the supply reel 25. The cams 34a, 34b are relatively positioned such that when the projection 8d of the control lever 8 engages the portion 34a2 of the cam 34a, the projection 39a of the swing arm 39 abuts against the portion 34b1 of the cam 34b, and when the projection 39b is held in engagement with the smaller-radius and larger-radius portions 34b2, 34b3 of the cam 34b, the projection 8d abuts against the portion 34a1 of the cam 34a.

Figure 8:
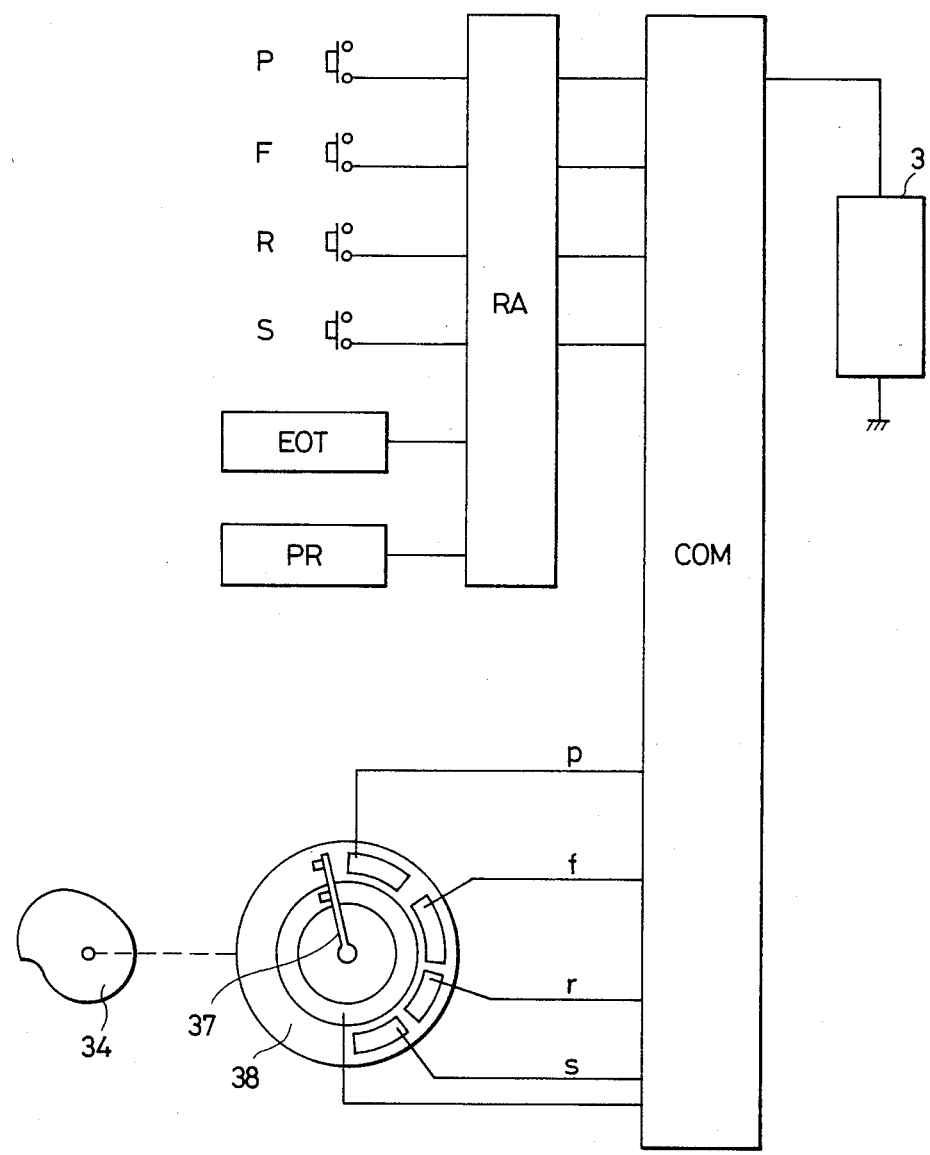
FIG. 8 is a block diagram of a circuit for controlling the drive mechanism of the invention.

When the head base 5 reaches the playback position in response to rotation of the cam plate 34, the brush 37 contacts a playback contact on the switch board 38 to deliver a playback signal p (FIG. 8). When the gear 20 meshes with the gear 25a of the supply reel 25, the brush 37 contacts a takeup contact on the switch board 38 to produce a takeup signal r. Upon meshing engagement between the gear 21 and the gear 24b of the takeup reel 24, the brush 37 is brought into contact with a fast forward contact on the switch board 38 to issue a fast forward signal f. When the head base 5 is in a stop position with the gears 21,20 head out of mesh with the respective gears 24b, 25a, the brush 34 is in contact with a stop contact on the switch board 38 to generate a stop signal s.

The control circuit arrangement will be described with reference to FIG. 8.

The control circuit includes a playback pushbutton P, a fast forward pushbutton F, a rewinding pushbutton R, a stop pushbutton S, a tape end detector EOT for producing an output in response to detection of a tape end or stopage of rotation of the reels 24, 25, and a power resetting circuit PR for delivering an output when the power supply is turned off. A mode latch circuit RA serves to temporarily latch information indicative of depression of the pushbuttons P, F, R, S, detection by the tape end detector EOT of a tape end, and detection by the power resetting circuit PR of a turn-off of the power supply. A comparator COM generates an output to energize the plunger 3 unless the output from the mode latch circuit RA agrees with the output from the switch board 38 dependent on the angular position of the cam plate 34.

When the mechanism is stopped, the power supply is turned on to energize the power resetting circuit PR and enable the mode latch circuit RA to produce a signal indicative of a stop mode. As the mechanism is stopped, the brush 37 is kept in contact with the stop contact on the switch board 38, and the stop signal s is supplied to the comparator COM. The comparator COM produces no output, and the plunger 3 remains de-energized. Accordingly, the mechanism remains stopped.

When the playback pushbutton P is depressed, the mode latch circuit RA produces a signal indicative of a playback mode. Since the mechanism is in the stop mode at this time, the output from the mode latch circuit RA does not agree with the output from the switch board 38. The comparator COM issues an output to energize the plunger 3 to bring the mechanism into a mode changing condition. As soon as the mechanism is in a mode of playback operation, the brush 37 reaches the playback contact on the switch board 38 to deliver the playback signal p to the comparator COM. The inputs to the comparator COM are now equal to each other, thus de-energizing the plunger 3 and stopping the mechanism which is then kept in the playback mode.

The mechanism can enter the fast forward mode, the rewinding mode, and the stop mode from the playback mode in a similar manner.

When the tape end detector EOT detects a tape end while the tape is being played back, fed at a high speed, or rewound, the tape end detector EOT sends an end signal to the mode latch circuit RA. The mode latch circuit RA delivers a stop siganl to the comparator COM, whereupon the mechanism is stopped in a manner similar to the foregoing operation.

When the power supply is turned off, the power resetting circuit PR supplies a reset signal to the mode latch circuit RA, which then delivers a stop signal to the comparator COM. Thus, the mechanism is stopped. It is necessary that the motor 2 and the plunger 3 be operated by a voltage charged in a capacitor or the like even when the power supply is turned off.

The mechanism thus constructed will operate under the control of the circuit of the foregoing arrangement as follows:

The mechanism is now in the stop position. That is, the projection 8d of the control lever 8 is positioned on the minimum-radius portion 34a3 of the first cam 34a with the control lever 8 lying substantially horizontally to lower the head base 5. The projection 39a of the swing arm 19 is located on the portion 34b1 of the second cam 34b to cause the wire 40 and the actuator lever 22 to put the selection lever 19 in the central position in which the gears 21,20 are held out of mesh with the gear 24b of the takeup reel 24 and the gear 25a of the supply reel 25, respectively.

When the power supply is turned on, the plunger 3 remains de-energized and the mechanism does not operate. However, the motor 2 is energized to transmit its rotative power through the belt 27, flywheel 26, the gear 29, the larger-diameter gear 15a, the smaller-diameter gear 15b, the larger-diameter gear 32a, to the smaller-diameter gear 32b. Since the smaller-diameter gear 32b is kept in mesh with the gear 21, the gears 20, 21 are caused to rotate. However, the reels 24, 25 do not rotate as the respective gears 24b, 25a out of mesh with the gears 21,20.

A playback mode of operation will now be described.

When the playback pushbutton P is depressed, the control circuit energizes the plunger 3 to retract the retractable rod which then enables the wire 3b to turn the control arm 17 counterclockwise. The angular movement of the control arm 17 causes its larger-diameter gear 18a to mesh with the gear 29 attached to the flywheel 26, whereupon the gear 18a starts to rotate. Rotative power from the gear 18a is transmitted through the smaller-diameter gear 18b, the larger-diameter gear 33a, the smaller-diameter gear 33b, the larger-diameter gear 35a, the smaller-diameter gear 35b, to the gear 34c on the cam plate 34, whereupon the cam plate 34 starts to rotate counterclockwise. When the cam plate 34 rotates, the cams 34a, 34b are rotated so that the projection 39a of the swing arm 39 engages the minimum-radius portion 34b2 of the second cam 34b, whereupon the wire 40 and the actuator lever 22 cause the selection lever 19 to move to the right until the gear 21 is brought into mesh with the gear 24b of the takeup reel 24. At this time, the control arm 17 has been turned counterclockwise to enable the projection 17a to push the distal end of the joint arm 14 to turn the latter clockwise. The larger-diameter gear 15a on the joint arm 14 is therefore out of mesh with the gear 29 on the flywheel 26. The gears 32a, 32b, and hence the gears 21, 20, do not rotate, and the takeup reel 24 fails to rotate. Since the projection 8d of the control lever 8 is held against the portion 34a1 of the first cam 34a, the head base 5 remains in the stop position. The switch board 38 delivers the fast forward signal f, which allows the comparator COM to continuously supply its output, thereby keeping the plunger 3 energized.

Continued energization of the plunger 3 causes the cam plate 34 to rotate to bring the projection 39a of the swing arm 39 into contact with the maximum-radius portion 34b3 of the second cam 34b. The selection lever 19 is now moved to the left by the wire 40 and the actuator lever 22, so that the gear 20 is brought into mesh with the smaller-diameter gear 25b of the supply reel 25. However, the supply reel 25 is prevented from rotating as described above. The plunger 3 still remains energized. With the projection 8d of the control lever 8 abutting against the cam portion 34a1 of the first cam 34a, the head base 5 moves upwardly but does not reach the playback position.

Figure 4:
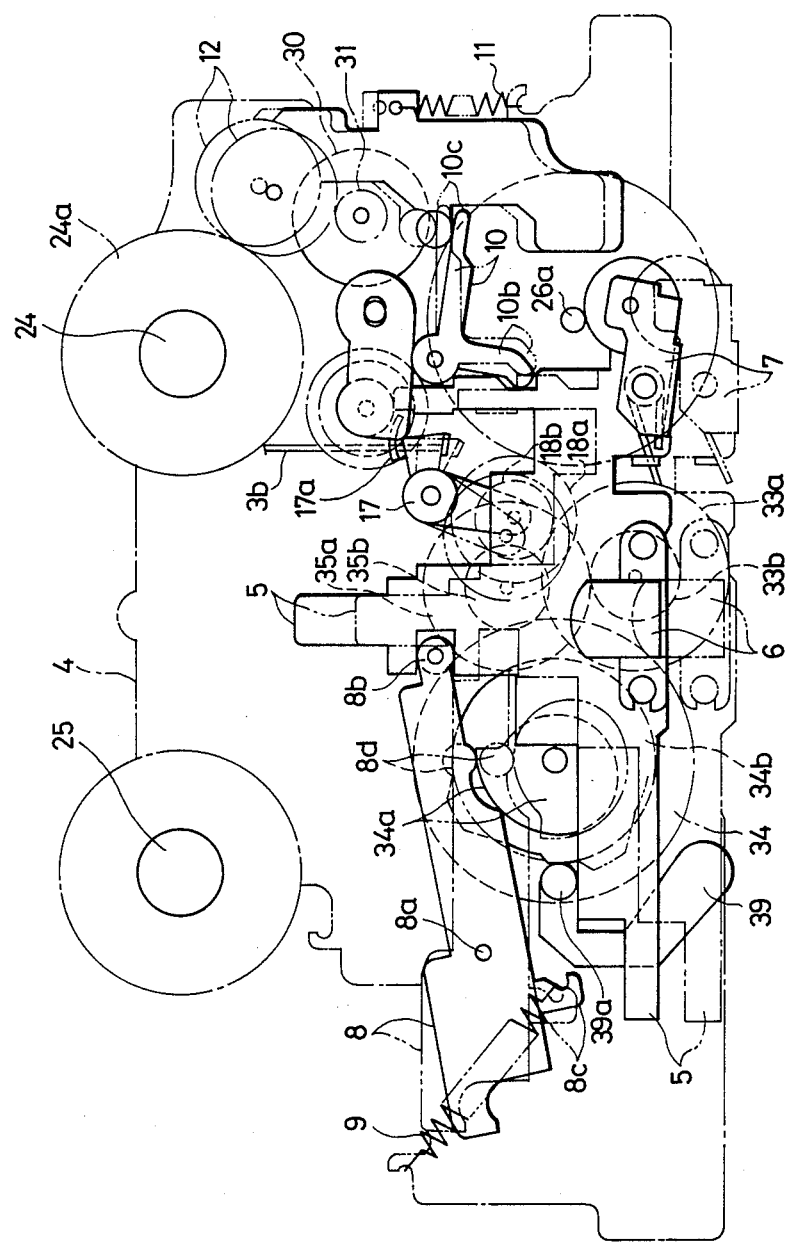
FIG. 4 is a plan view of the drive mechanism with its components ready for being shifted from a stop position to a playback position.

As the cam plate 34 rotates further, the projection 39a of the swing arm 39 engages the portion 34b1 of the second cam 34b, whereupon the selection lever 19 is positioned in its neutral position by the wire 40 and the actuator lever 22. The gears 21,20 are held out of mesh with the gears 24b, 25a, and the reels 24, 25 do not rotate. The projection 8d of the control lever 8 is progressively turned counterclockwise by contact with the first cam 34a to move the head base 5 upwardly. When the projection 8d reaches the maximum-radius portion 34a2 of the first cam 34a, the head base 5 is advanced to the playback position, and the pinch roller 7b is pressed against the capstan 26a under the force of the torsion spring 7c as shown in FIG. 4. When the head base 5 thus arrives at its uppermost position, the slide 10b of the swing lever 10 enters the recess 5e in the guide 5d, allowing the swing lever 10 to turn clockwise. The slide lever 11 is lowered under the resiliency of the spring 13 until the gear 12 meshes with the gear 31 of the pulley 30. Since the pulley 30 is rotated at all times by the motor 2c through the pulley 2, the belt 27, the flywheel 26, the pulley 26b, and the belt 28, the takeup reel 24 is rotated by the larger-diameter gear 24a and the gear 12 for playing back the magnetic tape. At this time, the switch board 38 delivers the playback signal, which is compared with the signal generated by the playback pushbutton P. Since the signals agree with each other, the comparator COM produces no signal, de-energizing the plunger 3 with the retractable rod projecting out.

The control arm 17 is now turned clockwise to disengage the larger-diameter gear 15a from the gear 29 on the flywheel 26. Accordingly, the cam plate 34 stops its rotation, and the mechanism is kept in the playback position.

Figure 5:
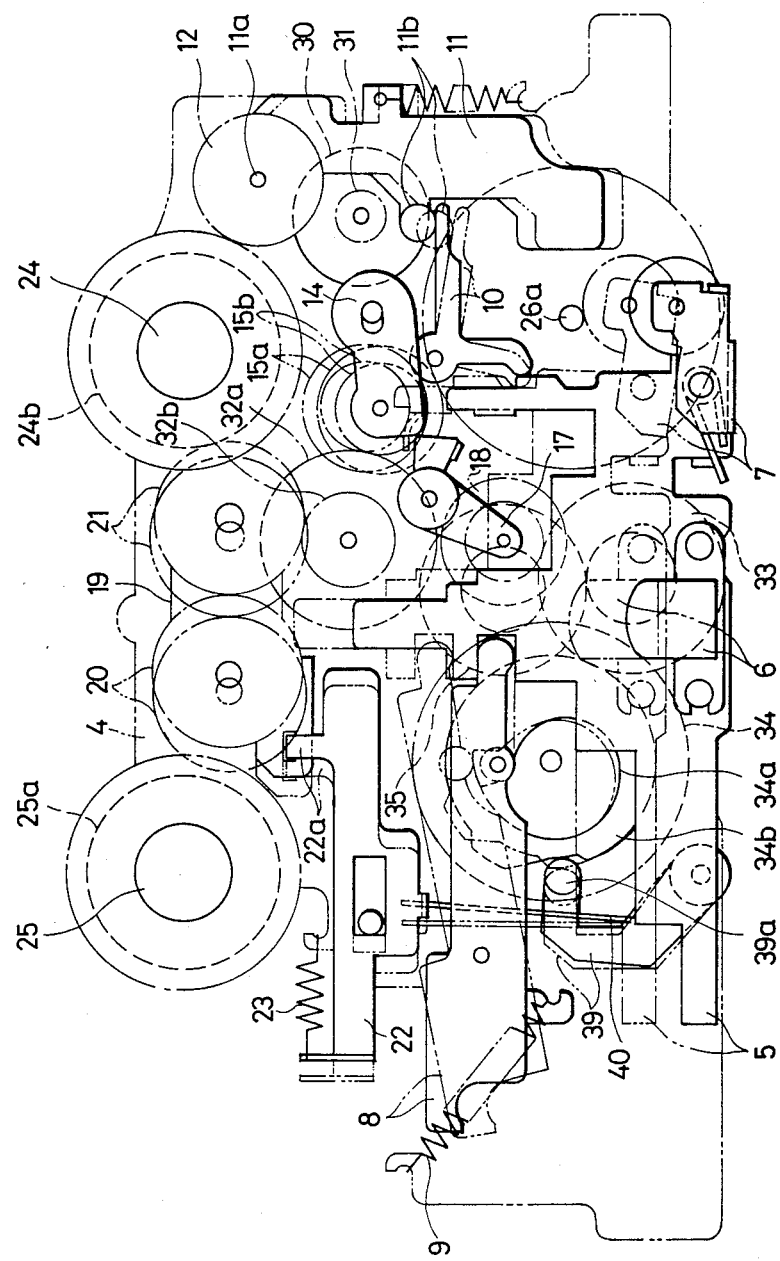
FIG. 5 is a plan view of the drive mechanism with its components ready for being shifted from the playback position to a fast foward position.

Operation of the mechanism for entering a fast forward mode from the playback mode will be described with an additional reference to FIG. 5.

When the fast forward pushbutton F is depressed, the mode latch circuit RA produces a signal different from the playback signal delivered from the switch board 38, and the comparator COM issues an output signal to energize the plunger 3. The retractable rod 3 is retracted to turn through the wire 36 the control arm 17 counterclockwise, thereby rotating the cam plate 34 counterclockwise in the manner described above. The projection 8d of the control lever 8 is held against the miminum-radius portion 34a3 of the first cam 34a, whereupon the control lever 8 is turned clockwise under the force of the spring 9 to bring the head base 5 back to the stop position. At this time, the pinch roller 7a is withdrawn out of contact with the capstan 26a. When the head base 5 is moved back downwardly, the slide 10b of the swing lever 10 is displaced out of the recess 5e in the guide 5d while angularly moving counterclockwise to enable the end 10c of the swing lever 10 to raise the projection 11b of the slide lever 11 against the force of the spring 13. As the slide lever 11 is thus lifted, the gear 12 is displaced out of mesh with the gear 31, and hence the takeup reel 24 comes to a halt.

Counterclockwise movement of the control arm 17 causes its projection 17a to swing the joint arm 14 clockwise until the larger-diameter gear 15a ascends out of mesh with the gear 29 on the flywheel 26. No rotative power is then transmitted to the gears 20, 21.

When the cam plate 34 is rotated to the stop position, the switch board 38 supplies the stop signal s to the comparator COM. Since the comparator COM is also supplied with the fast forward signal from the mode latch circuit RA, the comparator COM keeps on producing its output to energize the plunger 3.

As the cam plate 34 rotates further, the projection 39a of the swing arm 39 is positioned on the minimum-radius portion 34b2 of the second cam 34b to permit the swing arm 39 to turn clockwise. The selection lever 19 is caused by the wire 40 and the actuator lever 22 to move to the right for thereby bringing the gear 21 into mesh with the gear 24b of the takeup reel 24.

When the cam plate 34 is thus turned to the fast forward position, the switch board 38 produces the fast forward signal f. The comparator COM no longer issues its output, and hence the plunger 3 is de-energized to return its retractable rod 3a. The control arm 17 is turned clockwise to release the joint arm 14, which is allowed to swing counterclockwise under the force of the torsion spring 16 until the larger-diameter gear 15a is moved into mesh with the gear 29 on the flywheel 26. Rotative power is then transmitted from the flywheel 26 to the gear 29 to the larger-diameter gear 15a to the smaller-diameter gear 15b to the larger-diameter gear 32a to the smaller-diameter gear 32b to the gear 21 to the gear 24b and then to the takeup reel 24, which is rotated to wind the magnetic tape at a higher speed.

Other modes of operation such as a rewinding mode will not be described as their operation can easily be understood from the foregoing description.

Cam plates according to other embodiments will be described with reference to FIGS. 6 and 7. The cams as shown in FIGS. 6 and 7 include a second cam 34b which is identical in shape to the second cam 34b of the foregoing embodiment, and hence description of such a second cam 34b will be omitted.

Figure 6:
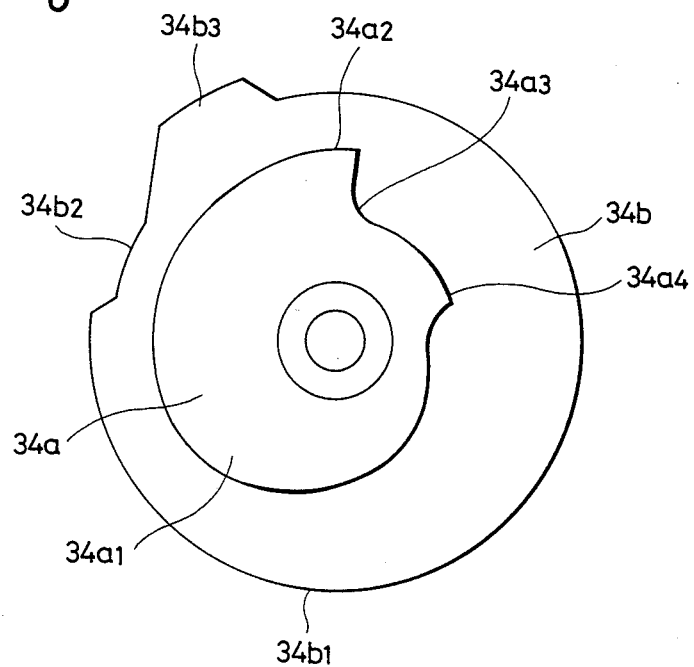
FIGS. 6 and 7 are front elevational views of cam plates according to other embodiments.

A first cam 34a illustrated in FIG. 6 differs from the first cam 34a of the preceding embodiment in that it includes a medium-radius portion 34a4 continuous to the portion 34a3 and having a radius larger than that of the portion 34a3. The medium-radius portion 34a4 serves to enable the control lever 8 to advance the head base 5 until the magnetic head 6 is held against the magnetic tape while the pinch roller 7b is kept out of engagement with the capstan 26a, during an interval in which the mechanism is in the fast forward or rewinding mode of operation by the second cam 34b. The cam plate 34 of FIG. 6 thus allows the magnetic tape to be monitored in the fast forward or rewinding mode of operation, an advantage which permits detection of unrecorded portions between pieces of music recorded on the magnetic tape.

Figure 7:
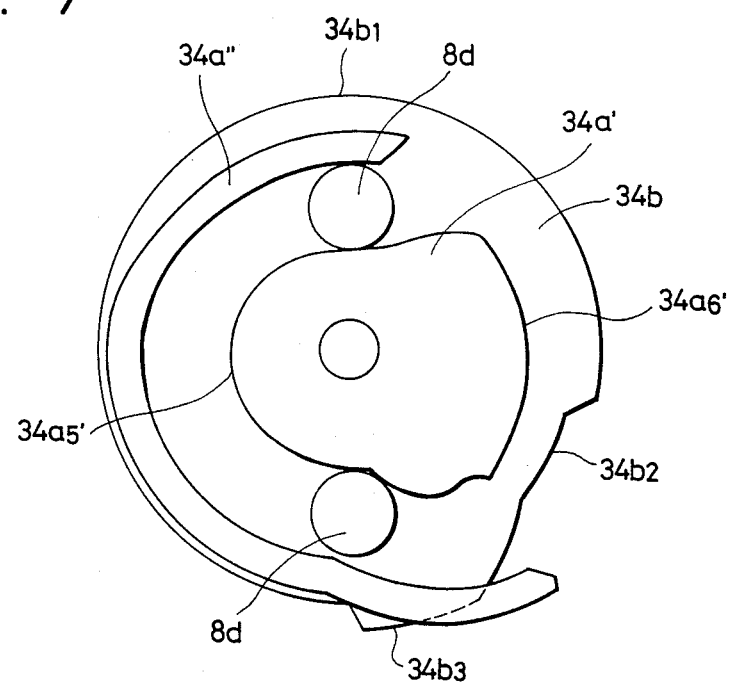

FIG. 7 shows a cam plate having a first cam 34a composed of a base cam 34a' and a wall cam 34a". The base cam 34a' comprises a substantially concentric portion 34a5' and a larger-radius portion 34a6' having an increased suface length. The wall cam 34a" extends arcuately around the portion 34a5' with a constant slot therebetween for guiding the projection 8d.

In the embodiment shown in FIGS. 1 through 5, the spring 9 acts on the control lever 8 to return the head base 5 to the stop position. The cam plate 34 is required to turn through a substantial angle before it reaches the playback position from the rewinding position. Therefore, it takes a relatively long period of time for the mechanism to reach the position for playing back the magnetic tape.

With the cam plate 34 as illustrated in FIG. 7, however, the force of the spring 9 can be utilized to advance the head base 5 for smoothly entering the playback mode of operation. The configuration of the larger-radius portion 34a6' of the base cam 34a' enables the head base 5 to move quickly to the playback position. Accordingly, the mechanism can rapidly be shifted from the rewinding mode to the playback mode of operation. The magnetic head 6 can be brought into contact with the magnetic tape by the concentric portion 34a5' for detecting unrecorded spaces between recorded pieces of music.

Although certain preferred embodiments have been shown and described, it should be understood that many changes and modifications may be made therein without departing from the scope of the appended claims.

What is claimed is:

1. A mechanism for driving a tape recorder, comprising takeup and supply reels (24, 25) having takeup and supply reel gears (24b, 25a), respectively;
   a pair of intermeshing gears (21, 20) rotatably disposed between said takeup and supply reel gears, and selectively engageable with said takeup and supply reel gears;
   a selection lever (19) supporting said intermeshing gears and selectively movable between a first position in which one of said intermeshing gears (21) is in mesh with said takeup gear (24b), a second position in which the other of said intermeshing gears (20) is in mesh with said supply reel gear (25a), and a third position in which said intermeshing gears are held out of mesh with said takeup and supply reel gears;
   a rotatable cam plate (34) having a series of cam faces for providing different modes of operation of the tape recorder;
   a swing arm (39) angularly movable by said rotatable cam plate in response to rotation thereof for moving said selection lever (19);
   a drive source (2) having an output gear (29);
   a pair of gear units (15a, 15b, 32a, 32b) meshing with each other, one of said gear units being engaged with one of said intermeshing gears (21) at all times and the other gear unit being engageable with said output gear (29) to rotate said pair of intermeshing gears;
   a joint arm (14) supporting said other gear unit, and movable to render the latter to be engaged with and disengaged from said output gear; and
   a control arm (17) angularly movable in response to selection of one of said different modes of operation for actuating said joint arm to displace said other gear unit out of mesh with said output gear while said cam plate is rotating to keep said pair of intermeshing gears from rotating.

2. A mechanism according to claim 1, wherein said cam plate has another series of different cam faces, further including a head base (5) supporting thereon a magnetic head (6), a control lever (8) slidably engaging said another series of different cam faces at a time and operatively coupled with said head base for moving the latter to a playback position when said control lever is held against one of said cam faces, and a slide lever (11) having a gear unit drivable by said output gear and movable into mesh with said takeup reel when said head base is in said playback position.

3. A mechanism according to claim 1, including an actuator lever (22) connected to said swing arm (39) and to said selection lever (19) for moving the latter between said first, second, and third positions in response to rotation of said cam plate.

* * * * *